(12) United States Patent
Choi et al.

(10) Patent No.: US 9,998,710 B2
(45) Date of Patent: Jun. 12, 2018

(54) APPARATUS AND METHOD FOR PROVIDING ULTRA HIGH DEFINITION VIDEO CONFERENCE

(71) Applicant: Electronics and Telecommunications Research Institute, Daejeon (KR)

(72) Inventors: Seung Han Choi, Daejeon (KR); Do Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days. days.

(21) Appl. No.: 15/220,613

(22) Filed: Jul. 27, 2016

(65) Prior Publication Data

US 2017/0201719 A1  Jul. 13, 2017

(30) Foreign Application Priority Data

Jan. 12, 2016 (KR) .................. 10-2016-0003722

(51) Int. Cl.
*H04N 7/14* (2006.01)
*H04N 7/15* (2006.01)
*G06F 3/0484* (2013.01)

(52) U.S. Cl.
CPC ......... *H04N 7/152* (2013.01); *G06F 3/04847* (2013.01); *H04N 7/147* (2013.01)

(58) Field of Classification Search
USPC .......................................... 348/14.01–14.09
See application file for complete search history.

(56) References Cited

U.S. PATENT DOCUMENTS

| | | | | |
|---|---|---|---|---|
| 2012/0274730 A1* | 11/2012 | Shanmukhadas | ...... | H04N 7/147 348/14.08 |
| 2013/0027502 A1* | 1/2013 | Skramstad | ............. | H04N 5/265 348/14.01 |
| 2013/0195184 A1* | 8/2013 | Nam | ...................... | H04N 19/44 375/240.12 |
| 2014/0098188 A1* | 4/2014 | Kwak | ...................... | G06T 3/40 348/38 |
| 2014/0111601 A1 | 4/2014 | Lee | | |
| 2014/0375755 A1 | 12/2014 | Choi et al. | | |

FOREIGN PATENT DOCUMENTS

| | | |
|---|---|---|
| KR | 100216601 B1 | 8/1999 |
| KR | 100226450 B1 | 10/1999 |
| KR | 101026033 B1 | 3/2011 |

* cited by examiner

Primary Examiner — Maria El-Zoobi
(74) Attorney, Agent, or Firm — William Park & Associates Ltd.

(57) ABSTRACT

Provided is an apparatus for supporting a video conference in a client terminal for a video conference system. The apparatus includes: an edition/rendering module configured to receive basic lattice layout screen data containing respective participant images included in a plurality of lattices and respective location information of the plurality of lattices applied to the basic lattice layout screen data; and an input module configured to input edition information, wherein, in response to the edition information input through the input module, the edition/rendering module classifies respective lattice images of the basic lattice layout screen data according to the respective location information, and generates new layout screen data edited with respect to the respective lattice images.

14 Claims, 6 Drawing Sheets

BASIC LATTICE LAYOUT SCREEN(G1)
RECEIVED BY CLIENT TERMINAL

TYPES OF EDITED(CUT, PASTE, COPY, SCALING, ANIMATING AND THE LIKE) SCREEN LAYOUTS

MAIN SPEAKER-BASED LAYOUT (G2)

SPECIFIC PARTICIPANT DELETION LAYOUT (G3)

ANIMATION EFFECT LAYOUT (G4)

VARIOUS LAYOUTS (G5)

FIG.6

APPARATUS AND METHOD FOR PROVIDING ULTRA HIGH DEFINITION VIDEO CONFERENCE

CROSS-REFERENCE TO RELATED APPLICATION

This application claims the benefit of priority to Korean Patent Application No. 10-2016-0003722, filed on Jan. 12, 2016 in the Korean Intellectual Property Office, the disclosure of which is incorporated here in in its entirety by reference.

BACKGROUND OF THE INVENTION

Field of the Invention

The present disclosure relates to an ultra high definition video conference system, and more particularly, to an apparatus and a method for providing various layouts of an ultra high definition video conference to a user.

Description of the Related Art

Figure 1:
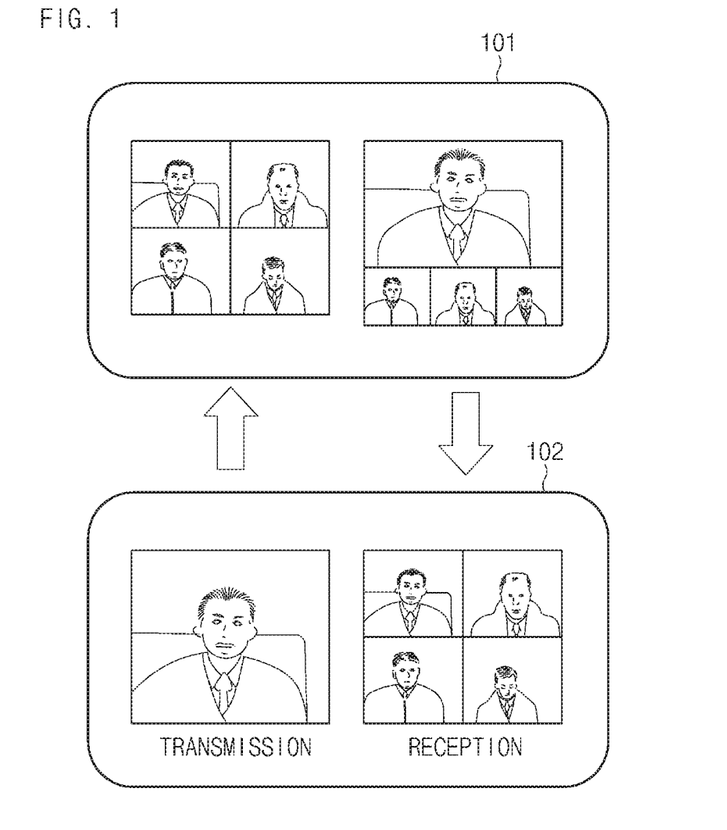
FIG. 1 is a diagram illustrating a video conference system according to the related art.

As shown in FIG. 1, a multi-point video conference control device 101 according to the related art mixes all video information received from all video conference participant clients 102 to generate a single video information or mixes all video information into a layout desired by the video conference participant client 102 to generate a plurality of video information, thereby unilaterally transmitting a corresponding video conference image to respective clients. That is, a user watching a video conference have nothing to do but receive and watch only a screen layout, which is shown through the client 102, configured by the multi-point video conference control device and cannot change the layout of the video conference screen.

However, a user wants more various layouts of a video conference screen according to an environment of user and a characteristic of the conference. In order to implement this, a different screen layout should be provided for each user. To this end, a mixing of respective video information should be performed for each client. The mixing of video information increases a load of the multi-point video conference control device and restricts the number of users who can attend a conference.

Further, in a multi-point video conference control device for providing Ultra High Definition (UHD) video due to the development of a definition quality technology and the increased user's demand for definition quality, since a quantity of processed information is large as compared with exiting high-definition (HD) or Full HD, the performance of encoding and decoding is further increased. Thus, when the performance of the multi-point video conference control device is low, various screen layouts cannot be provided to the user. In addition, when the performance of the multi-point video conference control device is increased, the cost is increased.

SUMMARY OF THE INVENTION

The present disclosure has been made in view of the above problems, and provides an apparatus and a method for a ultra high definition video conference system which is able to generate various screen layouts through editions such as cut, copy, paste, scaling, and animating by a participant client terminal with respect to a mixed video generated from a multi-point video conference control device, in order to reduce a load of a video mixing performance for various screen layouts of a multi-point video conference control device and to provide a video conference image with respect to various screen layouts to a user when providing a UHD video conference as well as a HD video conference, and a FullHD video conference.

In accordance with an aspect of the present disclosure, an apparatus for supporting a video conference in a client terminal for a video conference system includes: an edition/rendering module configured to receive basic lattice layout screen data containing respective participant images included in a plurality of lattices and respective location information of the plurality of lattices applied to the basic lattice layout screen data; and an input module configured to input edition information, wherein, in response to the edition information input through the input module, the edition/rendering module classifies respective lattice images of the basic lattice layout screen data according to the respective location information, and generates new layout screen data edited with respect to the respective lattice images.

The edition information includes information related to a moving arrangement, a selecting from among a plurality of lattice images and setting to a full screen, a cut of a corresponding lattice image, an animating of a corresponding lattice image, a scaling of a corresponding lattice image, a scaling up or down of a corresponding lattice image, or a copy of a corresponding lattice image a paste of the copied lattice image, with respect to the respective lattice images.

The apparatus further includes an encoding module configured to transmit encoding data of video data for the participant image to an external multi-point video conference control device.

The apparatus further includes a decoding module configured to receive and decode encoding data of the basic lattice layout screen data from an external multi-point video conference control device, and provide decoded data as the basic lattice layout screen data.

The edition/rendering module receives the basic lattice layout screen data and respective location information of the plurality of lattices, from a multi-point video conference control device configured to receive video data for the respective participant images from at least one client terminal and generate the basic lattice layout screen data and the respective location information of the plurality of lattices.

The multi-point video conference control device includes: a video mixing module configured to receive and decode encoded video data for the respective participant images received from the at least one client terminal, and mix respective decoded data to generate the basic lattice layout screen data; and a server protocol module configured to receive the respective location information of the plurality of lattices generated according to the number of the plurality of lattices applied by the video mixing module, and transmit the received respective location information to the at least one client terminal.

The apparatus further includes a client protocol module configured to transmit the respective location information of the plurality of lattices received from the server protocol module to the edition/rendering module.

In accordance with another aspect of the present disclosure, a method for supporting a video conference in a client terminal for a video conference system includes: receiving basic lattice layout screen data containing respective participant images included in a plurality of lattices and respective location information of the plurality of lattices applied to the basic lattice layout screen data; and classifying respective lattice images of the basic lattice layout screen data according to the respective location information and generating new layout screen data edited with respect to the respective lattice images, in response to the edition information input through the input module.

The edition information includes information related to a moving arrangement, a selecting from among a plurality of lattice images and setting to a full screen, a cut of a corresponding lattice image, an animating of a corresponding lattice image, a scaling of a corresponding lattice image, a scaling up or down of a corresponding lattice image, or a copy of a corresponding lattice image a paste of the copied lattice image, with respect to the respective lattice images.

The method further includes transmitting encoding data of video data for the participant image to an external multi-point video conference control device.

The method further includes receiving and decoding encoding data of the basic lattice layout screen data from an external multi-point video conference control device, and providing decoded data as the basic lattice layout screen data.

Receiving basic lattice layout screen data includes receiving the basic lattice layout screen data and respective location information of the plurality of lattices, from a multi-point video conference control device configured to receive video data for the respective participant images from at least one client terminal and generate the basic lattice layout screen data and the respective location information of the plurality of lattices.

The multi-point video conference control device includes: a video mixing module configured to receive and decode encoded video data for the respective participant images received from the at least one client terminal, and mix respective decoded data to generate the basic lattice layout screen data; and a server protocol module configured to receive the respective location information of the plurality of lattices generated according to the number of the plurality of lattices applied by the video mixing module, and transmit the received respective location information to the at least one client terminal.

The method further includes receiving the respective location information of the plurality of lattices from the server protocol module through a processing according to a certain protocol using a client protocol module.

In accordance with the apparatus and the method for the ultra high definition video conference system, video conference images for various screen layouts can be provided to a user in a UHD video conference as well as a HD video conference, and a FullHD video conference, without adding a load of a video mixing performance in a multi-point video conference control device, by generating various screen layouts through editions such as cut, copy, paste, scaling, and animating by the participant client terminal and supporting to progress a video conference with respect to a mixed video generated in the multi-point video conference control device.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 2:
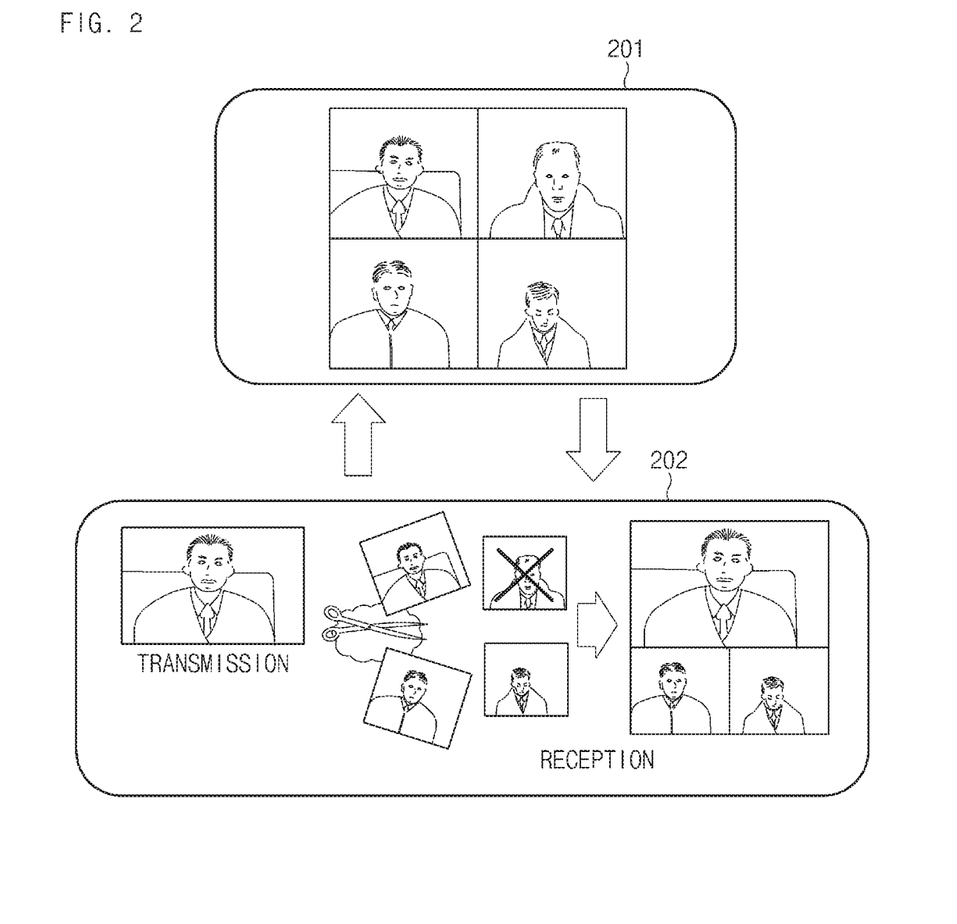
FIG. 2 is a diagram illustrating an operation concept of a video conference system including a multi-point video conference control device and a client terminal according to an embodiment of the present disclosure.

FIG. 2 is a diagram illustrating an operation concept of a video conference system including a multi-point video conference control device 201 and a client terminal 202 according to an embodiment of the present disclosure.

The multi-point video conference control device 201 and the client terminal 202 may be associated with each other through a wired/wireless network for supporting a wired Internet communication, a wireless Internet communication such as wireless fidelity (Wi-Fi) and WiBro, a mobile communication such as WCDMA, LTE, or a Wireless Access in Vehicular Environment (WAVE) wireless communication. The client terminal 202 may include a wired terminal such as a desktop PC, other communication dedicated terminal, or the like, and may include a wireless terminal such as a smart phone, a tablet PC, a notebook PC, a wearable device, and the like which can perform voice/image phone communication according to a communication environment.

For example, FIG. 2 shows a single client terminal 202. However, when a video conference is progressed, a plurality of participants may progress a video conference through respective client terminals 202. In order to support the progress of the ultra high definition video conference, the multi-point video conference control device 201 may be established in the form of a server in the network. In some cases, the multi-point video conference control device 201 may be implemented to be located in the inside of each client terminal 202.

When the video conference is progressed, a participant may input a voice to a microphone provided in or connected to the client terminal 202 and a participant image may be photographed through a camera provided in or connected to the client terminal 202. Video data for video conference participant(s) and audio data for the voice of the participant(s) may be transmitted to the multi-point video conference control device 201.

The multi-point video conference control device 201 may transmit and receive video/audio data for the video conference participant(s) to and from the client terminal 202 of video conference participant(s) to support to accomplish a video conference. Accordingly, the client terminal 202 of video conference participant(s) may play the video/audio data received from the multi-point video conference control device 201 to accomplish a realistic video conference between remote other terminal(s).

In particular, according to the present invention, video conference images for various screen layouts can be provided to a user in a UHD video conference as well as a HD video conference, and a FullHD video conference, without adding a load of a video mixing performance in a multi-point video conference control device, by generating various screen layouts through editions such as cut, copy, paste, scaling, and animating by the participant client terminal and supporting to progress a video conference, with respect to a mixed video generated in the multi-point video conference control device 201.

Figure 3:
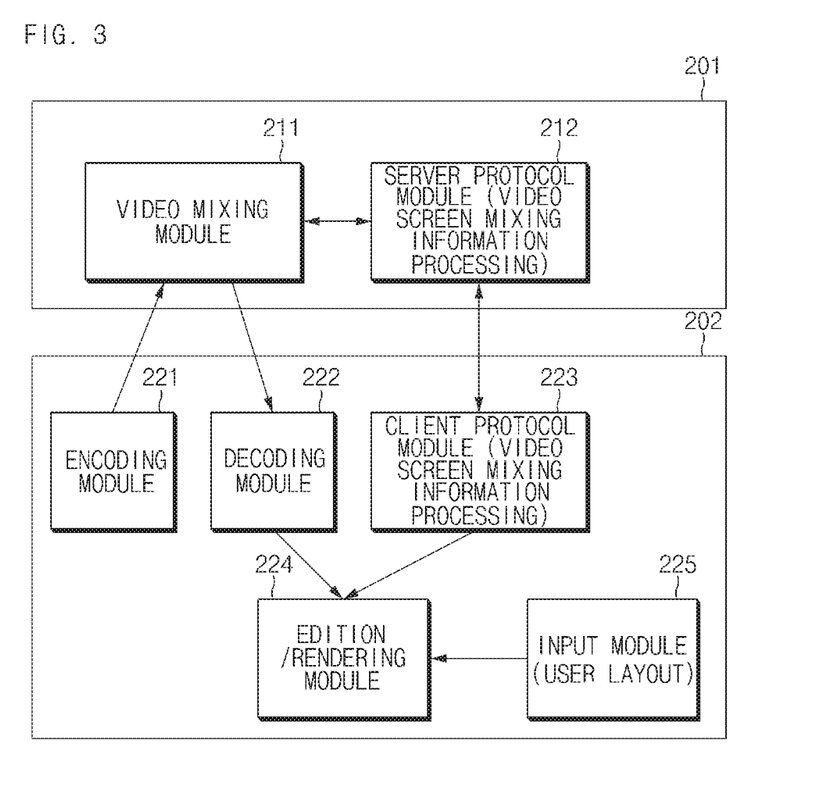
FIG. 3 is a block diagram illustrating the multi-point video conference control device and the client terminal according to an embodiment of the present disclosure.

FIG. 3 is a block diagram illustrating the multi-point video conference control device 201 and an apparatus 202 for supporting a video conference in the client terminal according to an embodiment of the present disclosure.

Referring to FIG. 3, the multi-point video conference control device 201 according to an embodiment of the present disclosure may include a video mixing module 211 and a server protocol module 212. Further, the apparatus 202 for supporting a video conference of the client terminal according to an embodiment of the present disclosure may include an encoding module 221, a decoding module 222, a client protocol module 223, an edition/rendering module 224, and an input module 225. The above constituent element of the multi-point video conference control device 201 and the client terminal 202 may be implemented by hardware, software, and a combination thereof.

First, an operation of the above constituent elements of the multi-point video conference control device 201 and the client terminal 202 for a video conference system is briefly described.

The video mixing module 211 of the multi-point video conference control device 201 may receive and decode an encoded video data for respective participant images received from at least one client terminal, and mixes respective decoding data to generate basic lattice layout screen data having the respective participant images contained in a plurality of lattices. The server protocol module 212 may receive respective location information of the plurality of lattices generated according to the number of the plurality of lattices applied by the video mixing module 211, and perform a processing according to a certain transmission/reception protocol to transmit to at least one client terminal 202.

The encoding module 221 of the client terminal 202 may transmit the encoding data of video data for the participant images to an external multi-point video conference control device 201.

The edition/rendering module 224 may receive basic lattice layout screen data and respective location information related to the plurality of lattices applied to the basic lattice layout screen data from the multi-point video conference control device 201, and may classify each lattice image of the basic lattice layout screen data according to the respective location information in response to edition information input through the input module 225 to generate new layout screen data edited for each lattice image.

The user may input the edition information such as a moving arrangement, selecting from among a plurality of lattice images and setting the selected lattice image to a full screen, the cut of a corresponding lattice image, the animating of the corresponding lattice image, the scaling of the corresponding lattice image, the scaling up or down of the corresponding lattice image, or the copy of the corresponding lattice image and the paste of the copied lattice image, with respect to the respective lattice images, through the input module 225.

In this case, the decoding module 222 may receive and decode the encoding data of the basic lattice layout screen data from the external multi-point video conference control device 201, and provide the decoded data as the basic lattice layout screen data. Further, the client protocol module 223 may process respective location information related to the plurality of lattices received from the server protocol module 212 according to a certain transmission/reception protocol and transmit the processed location information to the edition/rendering module 224.

Figure 4:
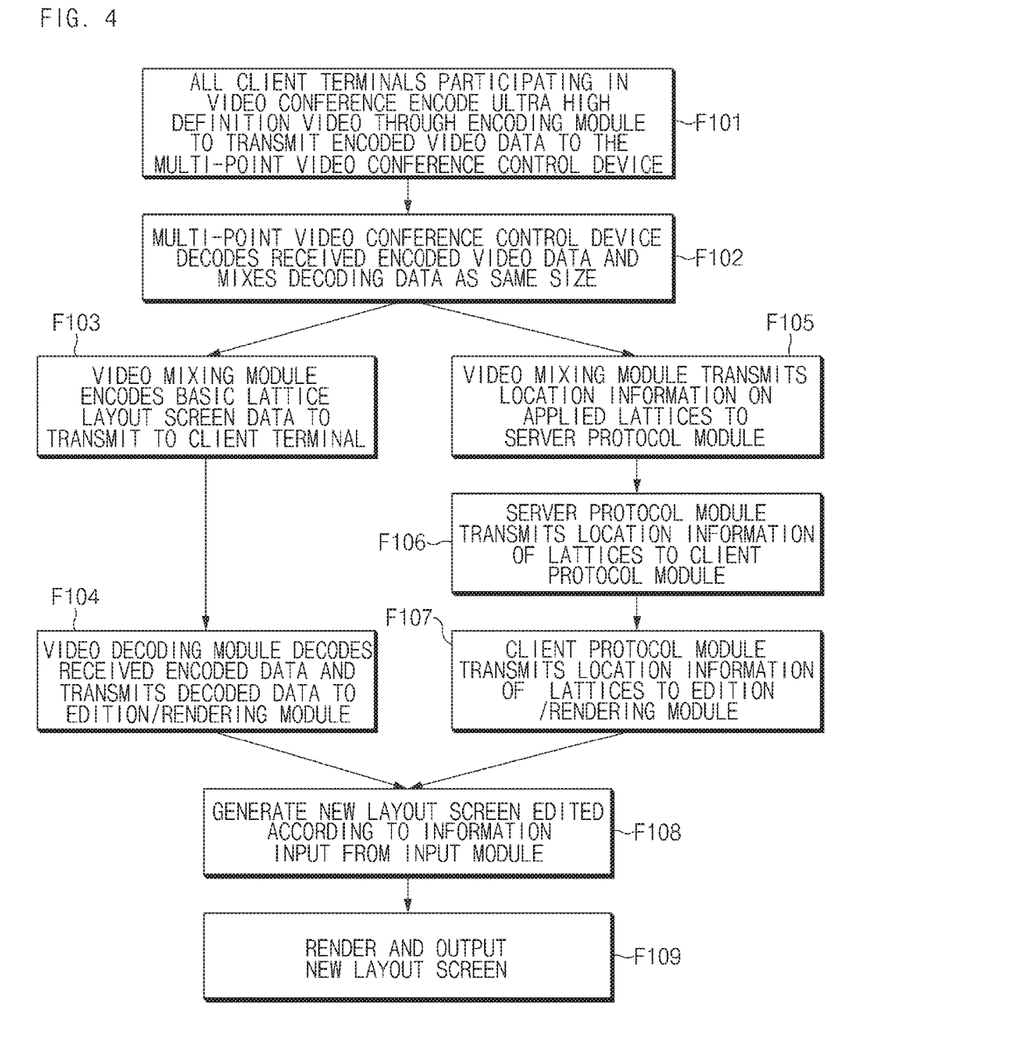
FIG. 4 is a flowchart illustrating an operation of a video conference system according to an embodiment of the present disclosure.

FIG. 4 is a flowchart illustrating an operation of a video conference system according to an embodiment of the present disclosure.

First, all client terminal(s) 202 participating in a video conference may encode the video data for corresponding participant images (ultra high definition) according to a certain encoding method through the encoding module 221 and transmit the encoded video data to the multi-point video conference control device 201 (F101).

A video mixing module 211 of the multi-point video conference control device 201 may decode respective encoded video data received by the video mixing module 211 from the client terminal(s) 202, and mix (combine) the respective decoding data to generate (configure) basic lattice layout screen data containing respective participant images included in a plurality of lattices and respective location information (e.g., (x, y) coordinate value of each corner) related to the plurality of lattices (F102).

The video mixing module 211 may determine the number of the plurality of lattices according to the number of the client terminals 202 participating in the video conference. For example, it is preferable that the plurality of lattices have the same size previously set according to the number. However, the present disclosure is not limited thereto. In some cases, it is possible that the size of the above lattices classified on the basic lattice screen (see G1 of FIG. 3) may be previously set to have different values.

The video mixing module 211 may encode basic lattice layout screen data containing respective participant images included in a plurality of lattices in a certain encoding method, and transmit the encoded basic lattice layout screen data to the client terminal 202 (F103). Thus, the decoding module 222 of the client terminal 202 may receive and decode the basic lattice layout screen data, and transmit the decoded data to the edition/rendering module 224 (F104).

In the meantime, the video mixing module 211 may transmit respective location information of a plurality of lattices applied to configure the basic lattice layout screen data to the server protocol module 212 (F105). Accordingly, the server protocol module 212 may transmit corresponding information to the client terminal 202 (F106). The client protocol module 223 may receives and transmit the corresponding information to the edition/rendering module 224 (F107).

As described above, when the edition/rendering module 224 receives the decoded basic lattice layout screen data and respective location information of the plurality of lattices applied to the decoded basic lattice layout screen data, the edition/rendering module 224 may classify respective lattice images of the basic lattice layout screen data according to the respective location information, and generate a new layout screen data obtained by editing the size, a location, a lattice pattern, the number of lattices and effects with respect to the respective lattice images according to edition information input from the participants or the user through the input module 225 (F108). The edition/rendering module 224 may output a video conference image for various screen layouts as shown in FIG. 5 according to the edited new layout screen data through a display (device) (F109).

Figure 5:
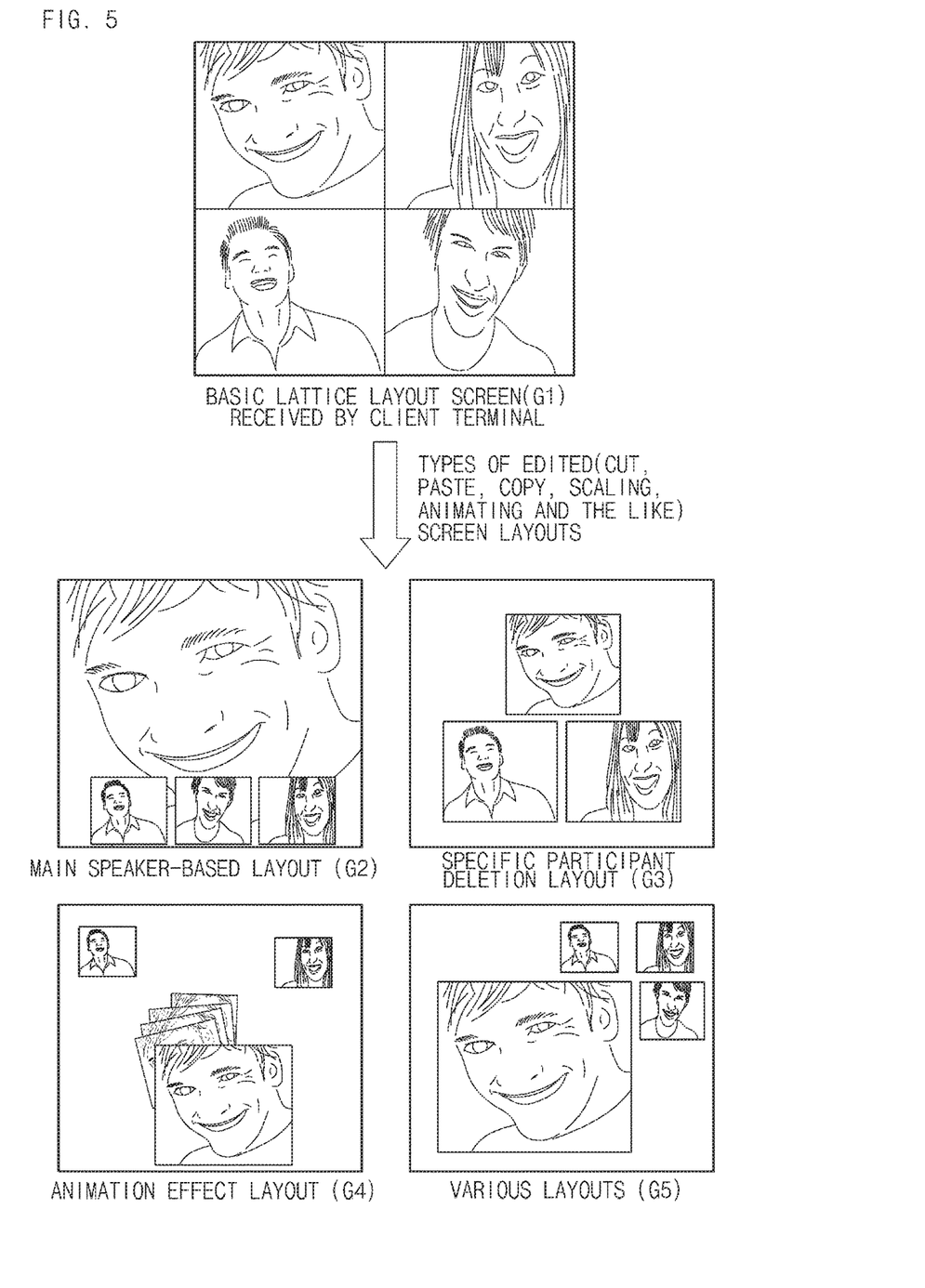
FIG. 5 is a diagram illustrating a concept of generating a video conference image with respect to various screen layouts to provide to the user in the video conference system according to an embodiment of the present disclosure.

The edition/rendering module 224 may support edition information input from the participants or the user, such as a moving arrangement, selecting from among a plurality of lattice images and setting the selected lattice image to a background screen (see G2 of FIG. 5), the cut of a corresponding lattice image (see G3 of FIG. 5), the animating of the corresponding lattice image (see G4 of FIG. 5), the scaling of the corresponding lattice image, or the scaling up or down of the corresponding lattice image (see G5 of FIG. 5). In addition, a plurality of lattice images for a single participant may be included through the copy of the corresponding lattice image and the paste of the copied lattice image, and, through this, convenience of edition may be provided. The animating (see G4 of FIG. 5) is an image processing for a three-dimensional effect. As shown in FIG. 5, a specific participant such as a current speaker may be classified and displayed by a three-dimensional effect overlapping a plurality of images enlarged from the front to the rear using a plurality of same images while distorting the images in a certain degree.

Figure 6:
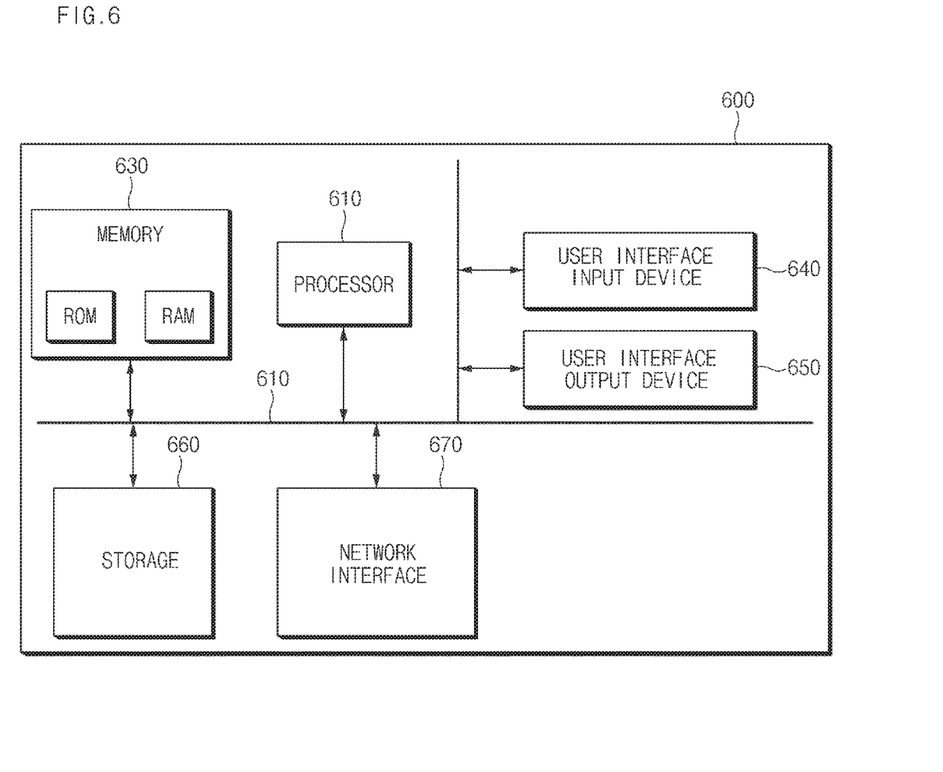
FIG. 6 is a block diagram illustrating an example of implementing the video conference system according to an embodiment of the present disclosure.

FIG. 6 is a block diagram illustrating an example of the method of implementing the video conference system according to an embodiment of the present disclosure. The multi-point video conference control device 201 and the client terminal 202 according to an embodiment of the present disclosure may be configured of hardware, software module, or a combination thereof. For example, the multi-point video conference control device 201 and the client terminal 202 according to an embodiment of the present disclosure may be implemented of a computing system 1000 as shown in FIG. 6.

The computing system 1000 may include at least one processor 1100 which is connected via a bus 1200, memory 1300, an user interface input device 1400, an user interface output device 1500, a storage 1600, and a network interface 1700. The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) 1310 and a Random Access Memory (RAM) 1320.

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

As described above, in accordance with the ultra high definition video conference system, video conference images for various screen layouts can be provided to a user in a UHD video conference as well as a HD video conference, and a FullHD video conference, without adding a load of a video mixing performance in a multi-point video conference control device, by generating various screen layouts through editions such as cut, copy, paste, scaling, and animating by the participant client terminal 202 and supporting to progress a video conference with respect to a video mixed for multi-participant image.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for supporting a video conference in a client terminal for a video conference system, the apparatus comprising:
   an edition/rendering module configured to receive basic lattice layout screen data containing respective participant images included in a plurality of lattices and respective location information of the plurality of lattices applied to the basic lattice layout screen data; and
   an input module configured to input edition information,
   wherein, in response to the edition information input through the input module, the edition/rendering module classifies respective lattice images of the basic lattice layout screen data according to the respective location information, and generates new layout screen data edited with respect to the respective lattice images,
   wherein the respective location information includes a coordinate value located at each corner of the plurality of lattices,
   wherein the edition information comprises information related to an animating of a corresponding lattice image, and
   wherein a current speaker of the video conference is displayed by the animating which is an image processing for a three-dimensional effect overlapping a plurality of images enlarged from the front to the rear using a plurality of same images while distorting the images in a certain degree.

2. The apparatus of claim 1, wherein the edition information comprises information related to a moving arrangement, a selecting from among a plurality of lattice images and setting to a full screen, a cut of a corresponding lattice image, a scaling of a corresponding lattice image, a scaling up or down of a corresponding lattice image, or a copy of a corresponding lattice image a paste of the copied lattice image, with respect to the respective lattice images.

3. The apparatus of claim 1, further comprising an encoding module configured to transmit encoding data of video data for the participant image to an external multi-point video conference control device.

4. The apparatus of claim 1, further comprising a decoding module configured to receive and decode encoding data of the basic lattice layout screen data from an external multi-point video conference control device, and provide decoded data as the basic lattice layout screen data.

5. The apparatus of claim 1, wherein the edition/rendering module receives the basic lattice layout screen data and respective location information of the plurality of lattices, from a multi-point video conference control device configured to receive video data for the respective participant images from at least one client terminal and generate the basic lattice layout screen data and the respective location information of the plurality of lattices.

6. The apparatus of claim 5, wherein the multi-point video conference control device comprises:
a video mixing module configured to receive and decode encoded video data for the respective participant images received from the at least one client terminal, and mix respective decoded data to generate the basic lattice layout screen data; and
a server protocol module configured to receive the respective location information of the plurality of lattices generated according to the number of the plurality of lattices applied by the video mixing module, and transmit the received respective location information to the at least one client terminal.

7. The apparatus of claim 6, further comprising a client protocol module configured to transmit the respective location information of the plurality of lattices received from the server protocol module to the edition/rendering module.

8. A method for supporting a video conference in a client terminal for a video conference system, the method comprising:
receiving basic lattice layout screen data containing respective participant images included in a plurality of lattices and respective location information of the plurality of lattices applied to the basic lattice layout screen data; and
classifying respective lattice images of the basic lattice layout screen data according to the respective location information and generating new layout screen data edited with respect to the respective lattice images, in response to the edition information input through the input module,
wherein the respective location information includes a coordinate value located at each corner of the plurality of lattices,
wherein the edition information comprises information related to an animating of a corresponding lattice image, and
wherein a current speaker of the video conference is displayed by the animating which is an image processing for a three-dimensional effect overlapping a plurality of images enlarged from the front to the rear using a plurality of same images while distorting the images in a certain degree.

9. The method of claim 8, wherein the edition information comprises information related to a moving arrangement, a selecting from among a plurality of lattice images and setting to a full screen, a cut of a corresponding lattice image, a scaling of a corresponding lattice image, a scaling up or down of a corresponding lattice image, or a copy of a corresponding lattice image a paste of the copied lattice image, with respect to the respective lattice images.

10. The method of claim 8, further comprising transmitting encoding data of video data for the participant image to an external multi-point video conference control device.

11. The method of claim 8, further comprising receiving and decoding encoding data of the basic lattice layout screen data from an external multi-point video conference control device, and providing decoded data as the basic lattice layout screen data.

12. The method of claim 8, wherein receiving basic lattice layout screen data comprises receiving the basic lattice layout screen data and respective location information of the plurality of lattices, from a multi-point video conference control device configured to receive video data for the respective participant images from at least one client terminal and generate the basic lattice layout screen data and the respective location information of the plurality of lattices.

13. The method of claim 12, wherein the multi-point video conference control device comprises:
a video mixing module configured to receive and decode encoded video data for the respective participant images received from the at least one client terminal, and mix respective decoded data to generate the basic lattice layout screen data; and
a server protocol module configured to receive the respective location information of the plurality of lattices generated according to the number of the plurality of lattices applied by the video mixing module, and transmit the received respective location information to the at least one client terminal.

14. The method of claim 13, further comprising receiving the respective location information of the plurality of lattices from the server protocol module through a processing according to a certain protocol using a client protocol module.

* * * * *